US009582975B2

(12) United States Patent
Meganathan et al.

(10) Patent No.: US 9,582,975 B2
(45) Date of Patent: Feb. 28, 2017

(54) ALARM ROUTING IN INTEGRATED SECURITY SYSTEM BASED ON SECURITY GUARDS REAL-TIME LOCATION INFORMATION IN THE PREMISES FOR FASTER ALARM RESPONSE

(71) Applicant: Honeywell International Inc., Morristown, NJ (US)

(72) Inventors: Deepak Sundar Meganathan, Bangalore (IN); Vivek Gopinath, Bangalore (IN); Sivarajan Manoharan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 18 days.

(21) Appl. No.: 14/606,259

(22) Filed: Jan. 27, 2015

(65) Prior Publication Data
US 2016/0217668 A1    Jul. 28, 2016

(51) Int. Cl.
*G08B 13/24*    (2006.01)
*H04W 4/00*    (2009.01)
(Continued)

(52) U.S. Cl.
CPC ......... *G08B 13/2491* (2013.01); *G08B 13/00* (2013.01); *G08B 25/14* (2013.01); *H04W 4/008* (2013.01)

(58) Field of Classification Search
CPC .... G08B 25/00; G08B 25/006; G08B 25/001; G08B 25/14; G08B 13/00; G08B 13/181;
(Continued)

(56) References Cited

U.S. PATENT DOCUMENTS 6,400,265 B1 * 6/2002 Saylor ............. G08B 13/19602
                                                340/506
6,505,086 B1 * 1/2003 Dodd, Jr. ........... G05B 19/0423
                                                340/511
(Continued)

FOREIGN PATENT DOCUMENTS

WO    2006101490 A1    9/2006
WO  WO 2006/096431 A2  9/2006
WO  WO 2013/159217 A1  10/2013

OTHER PUBLICATIONS

Extended European search report from corresponding EP patent application 16152494.7, dated Jun. 15, 2016.

*Primary Examiner* — Ali Neyzari
(74) *Attorney, Agent, or Firm* — Husch Blackwell LLP

(57) ABSTRACT

An apparatus is provided that includes a plurality of Bluetooth low energy devices (BLEs) embodied as stand-alone devices or incorporated into a respective security sensor, each at known locations within a secured geographic area, a plurality of portable wireless devices within the secured area, each receiving location information via signals from a nearby one or more of the plurality of BLEs, and a security system of the secured area that receives location information from the plurality of portable wireless devices, detects a security breach within the secured area, sends a notification to each of the plurality of wireless devices, and assigns a user of one of the plurality of portable wireless devices to investigate the breach based upon proximity of the one portable device to the breach.

26 Claims, 3 Drawing Sheets

(51) Int. Cl.
*G08B 13/00* (2006.01)
*G08B 25/14* (2006.01)

(58) Field of Classification Search
CPC .............. G08B 25/009; G08B 13/2491; G07C 9/00103; G06F 21/31; G06K 7/10366
USPC ..................... 340/506, 5.23, 539.1, 524, 541
See application file for complete search history.

(56) References Cited

U.S. PATENT DOCUMENTS

| | | | |
|---|---|---|---|
| 6,686,838 B1 * | 2/2004 | Rezvani | G06F 21/31 340/10.1 |
| 2003/0217150 A1 | 11/2003 | Roese et al. | |
| 2012/0257615 A1 | 10/2012 | Eskildsen et al. | |
| 2014/0039685 A1 * | 2/2014 | Blount | G05B 15/02 700/276 |
| 2014/0266687 A1 * | 9/2014 | Britton | G08B 25/003 340/539.1 |
| 2015/0278829 A1 * | 10/2015 | Lu | H04W 64/00 705/7.29 |
| 2016/0078698 A1 * | 3/2016 | Moses | G08B 25/14 340/5.23 |

\* cited by examiner

ALARM ROUTING IN INTEGRATED SECURITY SYSTEM BASED ON SECURITY GUARDS REAL-TIME LOCATION INFORMATION IN THE PREMISES FOR FASTER ALARM RESPONSE

FIELD

This application relates to security systems and, more particularly, to security systems supported with human guards.

BACKGROUND

Systems are known to protect people and assets within secured areas. Such systems are typically based upon the use of one or more sensors that detect threats within the secured area.

Threats to people and assets may originate from any of a number of different sources. For example, an intruder may rob or injure occupants who are present within the area. Alternatively, a fire may kill or injure occupants who become trapped by a fire in a building.

In order to detect threats, one or more sensors may be placed throughout a building. For example, intrusion sensors may be placed on the doors and/or windows of a building. Similarly, smoke detectors may be placed in a cafeteria, living areas, or corridors.

In most cases, threat detectors are connected to a local control and monitoring panel. In the event of a threat detected via one of the sensors, the control panel may sound a local audible alarm. The control panel may also send a signal to a central monitoring station.

Located on the control panel or nearby may be a display screen that displays the status of the fire and/or security system. In the event of a breach of security, a guard may be dispatched to the site of the breach to investigate.

While such systems work well, a guard may not always be available to respond to a breach. For example, the guard may be patrolling remote areas of the building or be on break. Accordingly, a need exists for better methods of utilizing security personnel.

DETAILED DESCRIPTION

Figure 1:
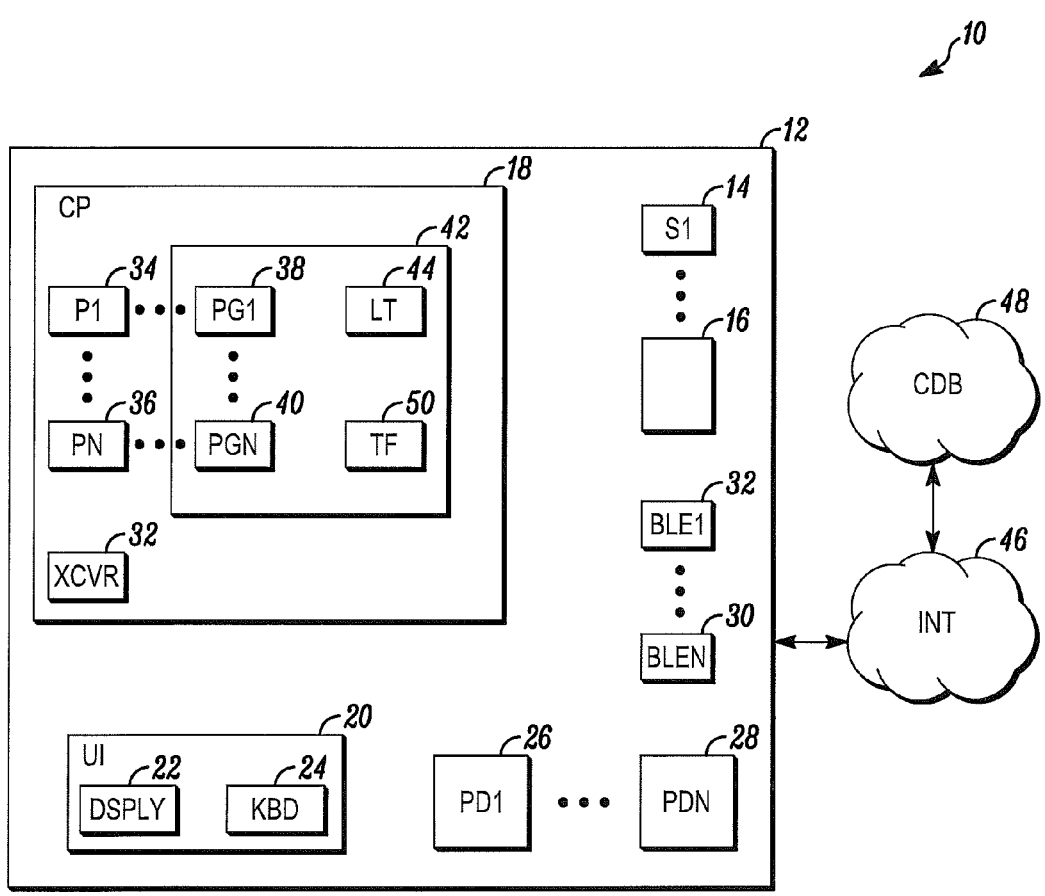
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a simplified block diagram of a security system 10 shown generally in accordance with an illustrated embodiment. Included within the system may be a number of threat sensors 14, 16 that protect a secured geographic area 12.

The threat sensors may be embodied in any of a number of different forms. For example, some of the sensors may be limit switches placed on the doors and windows around the periphery of the secured area and used to detect intruders. Other sensors may be passive infrared (PIR) sensors placed in the interior of the space to detect intruders who have been able to evade sensors placed along the periphery. Still other sensors may be closed circuit television (CCTV) cameras that detect motion within a field of view of the camera.

One or more of the sensors may also detect environmental threats. In this regard, some of the sensors may be fire or gas detectors.

Also included within the system is a control panel 18 that monitors the sensors and a user interface 20 that controls the security system. The user interface may be located at a guard's station within the secured area or located at a remote site.

Within the user interface may be a display 22 and a keyboard 24. In the event of a security breach detected by one of the sensors, the identity and location of the sensor detecting the breach may be shown on the display. In the case where the sensors include one or more cameras, a human guard may use the keyboard to select one or more cameras to remotely view the area of the security breach.

In addition, one or more mobile or portable wireless devices (e.g., smartphones) 26, 28 may be provided for use within the area. The portable devices may be carried by guards as they patrol the secured area.

Distributed throughout the secured area may be one or more Bluetooth low energy (BLE) devices 30, 32. The Bluetooth low energy devices transmit a radio frequency signal containing location information. The Bluetooth low energy devices may be embodied as stand-alone devices as shown in FIG. 1, or one or more of them may be incorporated into one or more of the intrusion sensors.

The intrusion sensors may be wired or wireless. Where wireless, the control panel and each of the sensors may include a radio frequency transceiver 32. Similarly, each of the portable devices and Bluetooth low energy devices include a respective radio frequency transceiver.

Included within the control panel, sensors, user interface, portable devices, and Bluetooth low energy devices may be one or more processor apparatuses (processors) 34, 36, each operating under control of one or more computer programs 38, 40 loaded from a non-transitory computer readable medium (memory) 42. As used herein, reference to a step performed by a computer program is also reference to the processor that executed that step.

In this regard, a monitoring processor may monitor a status of each of the sensors for security breaches. Upon detecting activation of one of the sensors, a display processor may display an alert along with details of the breach on the display of the user interface.

A guard at the user interface may observe the alert and, via the keyboard, select a camera in the area of the breach. The guard may also enter commands through the keyboard to pan, tilt, and zoom the camera to obtain more detail of the situation surrounding the breach.

In cases where the security system does not have cameras or in addition, a guard may be dispatched to investigate the breach. In cases where the system does have cameras, it may still be necessary to dispatch a human guard in order to address or correct the cause of the breach. This would be necessary, for instance, where an authorized human occupant of the secured area accidentally triggers an intrusion sensor.

Under one illustrated embodiment, the security system automatically determines a location of each guard and assigns a guard to investigate each breach. This may be important where there is a limited number of guards and where a guard is not available at the monitoring console when a breach occurs (e.g., a guard is on patrol).

The location of each guard is determined through the portable device carried by the guard based upon location information retrieved from the Bluetooth low energy transmissions. In this regard, as the guard walks through the secured area, a monitoring processor within the portable device detects Bluetooth low energy signals as the guard approaches a location of a Bluetooth low energy device. Since Bluetooth low energy devices have only a limited range, the monitoring processor detects Bluetooth transmissions only when the guard is very close to the Bluetooth low energy device.

The location information from the Bluetooth low energy devices may be provided under any of a number of different formats. Under one format, the location information may be in the form of geographic coordinates. Alternatively, the location information may be in the form of an identifier of the Bluetooth low energy device where the identifier is cross-referenced to a location (i.e., the geographic coordinates) via a lookup table 44.

As the portable devices detect Bluetooth signals, a tracking processor composes and sends a location message to a tracking database. The location message may include an identifier of the portable device, the location information, and a time.

Under one preferred embodiment, the location message may be saved by the portable device to a cloud database (cloud server) 48 through the Internet 46. Under another preferred embodiment, the location information may be saved in a database 50 of the control panel.

Upon detecting a security breach via an activated sensor, a location processor within the control panel may determine a geographic location of the activated sensor via the lookup table. The location processor may also retrieve location information about each one of the portable devices. This may be accomplished by downloading location information from the cloud database or from the tracking file. In each case, a distance processor may determine a distance between each of the portable devices and the activated sensor.

The distance processor may compare the determined distances between each of the portable devices and the activated sensor and select the one portable device having the least relative distance separating the portable device from the activated sensor. Upon selecting the one portable device, an assignment processor may assign investigation of the breach to the guard carrying the one portable device.

Alternatively, at least some of the Bluetooth low energy devices may be mapped to a nearby or coincident sensor. In this situation, any portable device receiving location information from the mapped Bluetooth low energy device would be assumed to be the closest portable device. Stated differently, if a breach occurs, then the distance processor merely selects the portable device that has most recently detected the Bluetooth low energy device mapped to the activated sensor.

In this regard, the assignment processor may compose and send an incident message to the portable device requesting that the guard investigate the breach. The message may include details of the breach, including an identifier and location of the activated sensor. The message may also include a map of the secured area identifying the location of the sensor or a link to the map.

Upon arriving at the site of the breach, the guard may investigate the breach. Upon investigating, the guard may activate a report button on the received incident message, thereby opening a report window. The guard may enter an explanation of his/her findings and resolution of the incident followed by activation of an enter button. Upon activating the enter button, the guard's report may be sent to a corresponding tracking file in which the report is associated with the details of the original security breach.

The system described herein offers a number of advantages over conventional systems. For example, in conventional systems, an alarm/event is detected and reported to an operator (security guard's workstation). The operator first reviews the alarm using one of a number of viewing utilities (e.g., video viewer, alarm viewer, map viewer, etc.). Next, the operator informs and requests that one of the security guards responds to the alarm in case any remedial action is needed at the alarm location.

However, the number of security guards available can be many, depending on the needs and size of the premises. Upon selecting one of the many guards, the operator notifies the selected guard of the alarm details. This may be through a walkie-talkie and may only include a general description of the problem. The selected guard goes to the site of the breach and acts upon problems found at the site. The guard may provide an update to the operator via walkie-talkie after attending to any problems found. The operator acknowledges the alarm via a log along with any comments provided by the guard assigned to correct the problem.

Even in the case of conventional security systems having a CCTV view of the breach, many CCTV operators will not attend to the events/alarms directly. In many cases, the CCTV operator will communicate the alarm details through VMS or phone to a person or technician assigned to attend to the alarm.

In smaller conventional security systems, alarms may be personally attended to by the security guards/professionals, depending upon the need. In many cases, they are the actual people located at the site and best suited to act on security beaches and to rectify problems associated with such breaches. Places that would practice such policies include prisons, research centers, airports, corporates offices, banks, education institutions, health care centers, resorts, casinos, and many more.

In conventional systems, the location of security guards is unknown to the security system or VMS system, thereby preventing a rapid response to security breaches. In the case of large premises, security guards are often on the move, patrolling the building, or following pre-established security tours.

In conventional systems, no systematic mechanism is provided to identify the location of security guards. This information is needed to identify the appropriate person, to route alarm details to the appropriate guard, and to facilitate fast corrective action. Accordingly, conventional systems have an increased time needed to respond to an alarm.

The novel system of FIG. 1 is based upon the automatic identification, by the security system control panel, of the location of nearby security guards using Bluetooth low energy devices. This allows the control panel to route alarm details to the identified security guard's mobile device in real time.

Bluetooth low energy (BLE) devices are programmed with hardcoded location information. These BLE devices (location sensors) are placed proximate each security system device and/or sensor (e.g., camera, access reader, PIR motion detector, door contacts, ingress and egress points, etc.). Additional sensors can be placed based upon the need (e.g., identified secured area/zone, corridor, lobby, entry/exit of floor, etc.).

Within a mobile application or via a cloud/web server, a user can identify each BLE as being associated (i.e., proximate) one or more security system devices/sensors installed in that particular location. For example, cameras and access readers in a main lobby are mapped with a BLE device mounted near the main lobby.

Each security guard is assigned one mobile device/application. Location information may be stored in the web/cloud server (system database).

Identifying a security guard's (mobile device's) current location is relatively straightforward. For example, assume that security guard number 1 patrols the premises with his/her mobile device. In addition, assume that security guard 1 approaches the main lobby and that the main lobby is assigned to BLE number 1 (BLE1). In this situation, the mobile device/application starts receiving the signal from BLE1. The mobile application sends data to the web/cloud server (e.g., security guard 1 was at BLE1 (main lobby) around 4:30 pm, Oct. 9, 2014. In the same way, the locations of all security guards (mobile devices) are tracked and maintained by the web/cloud server.

Figure 2:
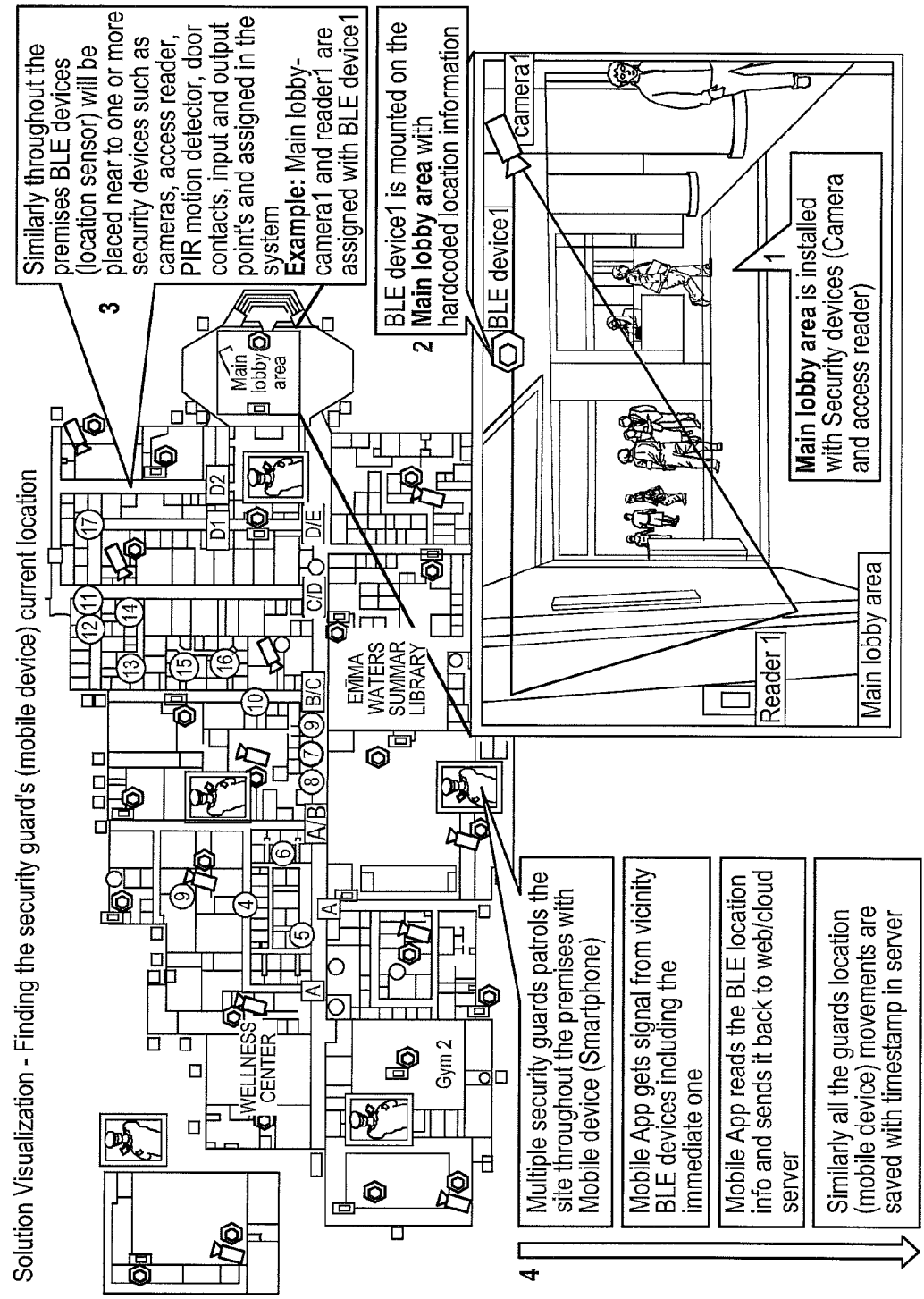
FIG. 2 depicts an initial set of steps performed by the system of FIG. 1.
Figure 3:
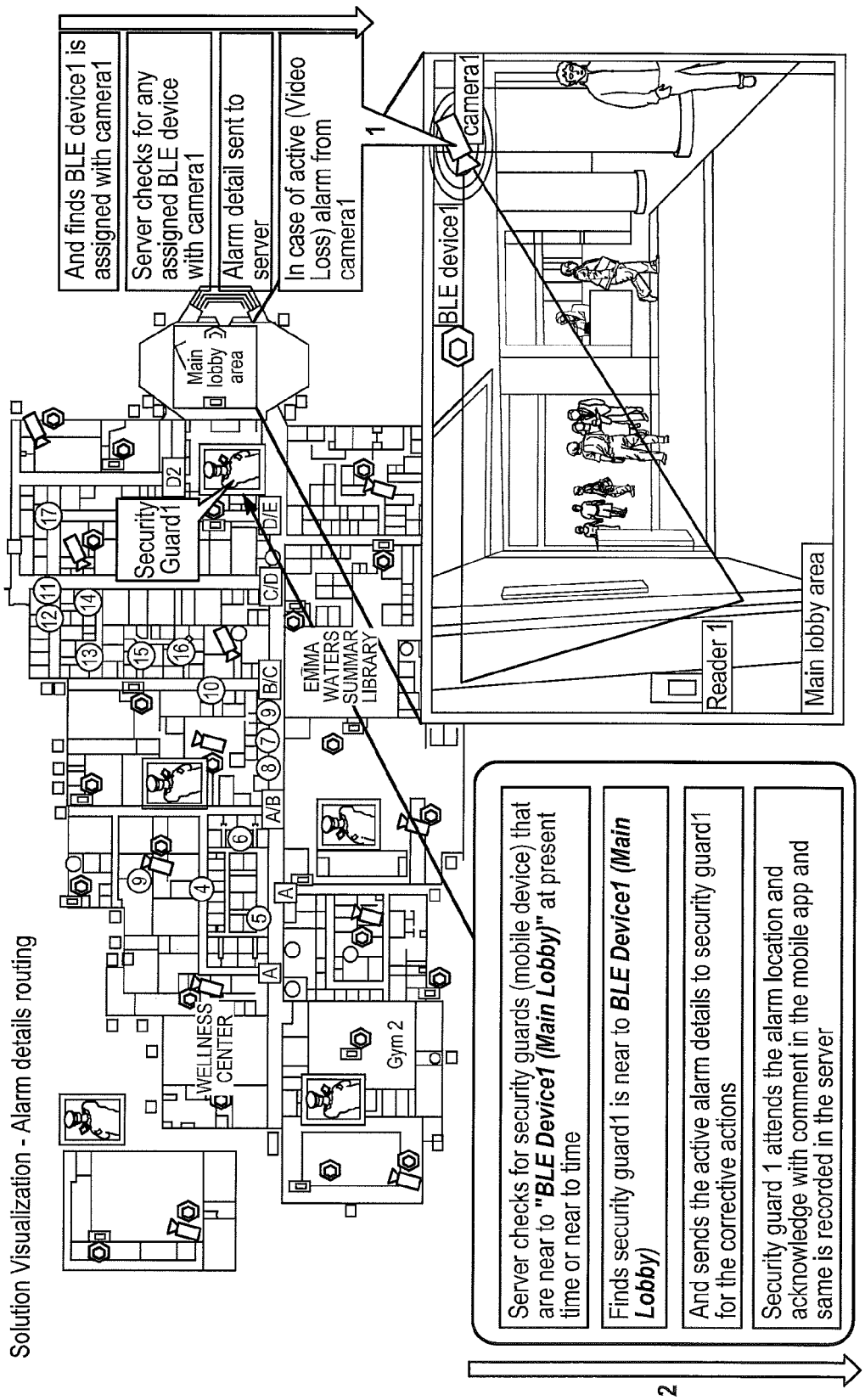
FIG. 3 depicts additional steps performed by the system of FIG. 1.

Similarly, the routing of alarm details is relatively straightforward. In the case of an active alarm in the system, the system finds the source device (e.g., alarm from camera 12) and identifies the BLE mapped to the device. Assume, for example, that camera 12 is in the main lobby and that the BLE mapped or otherwise assigned to the camera is BLE1. In this case, the system checks the cloud server for security guards (mobile devices) that are near to BLE1 (main lobby) at the present time or recently as summarized in FIG. 2. If the system is able to identify a mobile devices (and security guard) that is in or has recently been in the main lobby, then the system sends the active alarm details to the identified security guard for corrective action as summarized in FIG. 3. The identified security guard attends to the activated device and acknowledges with comments through the mobile application, and the comments are recorded in the server.

In general, the system includes a plurality of Bluetooth low energy devices (BLEs) embodied as stand-alone devices or incorporated into a respective security sensor, each at known locations within a secured geographic area, a plurality of portable wireless devices within the secured area, each receiving location information via signals from a nearby one or more of the plurality of BLEs, and a security system of the secured area that receives location information from the plurality of portable wireless devices, detects a security breach within the secured area, sends a notification to each of the plurality of wireless devices, and assigns a user of one of the plurality of portable wireless devices to investigate the breach based upon proximity of the one portable device to the breach.

Alternatively, the system includes a plurality of sensors, each at a known location within a secured geographic area, a plurality of Bluetooth low energy devices (BLEs), each at a known location within the secured geographic area with respect to a respective sensor of the plurality of sensors, a plurality of portable wireless devices within the secured area, each receiving location information via signals from one or more of the plurality of BLEs, and a security system of the secured area that detects a security breach via activation of one of the plurality of sensors, receives location information from the plurality of portable devices, identifies one of the plurality of portable devices relatively closest the activated sensor, and sends instructions to a user of the one portable device to investigate the activated sensor.

Alternatively, the system includes a security system that protects a secured geographic area, a plurality of sensors of the security system, each at a known location within the secured geographic area, a plurality of Bluetooth low energy devices (BLEs), each at a known location within the secured geographic area, a plurality of portable wireless devices within the secured area, each receiving location information via signals from one or more of the plurality of BLEs, and a processor of the security system of the secured area that detects a security breach via activation of one of the plurality of sensors, receives location information from the plurality of portable devices, identifies one of the plurality of portable devices relatively closest the activated sensor, and sends instructions to a user of the one portable device to investigate the activated sensor.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be add to or removed from the described embodiments.

The invention claimed is:

1. An apparatus comprising:
   a plurality of Bluetooth low energy devices (BLEs), wherein each of the plurality of BLEs is positioned within a secure geographic area;
   a plurality of portable wireless devices within the secure geographic area, wherein each of the plurality of portable wireless devices receives first location information via signals from one of the plurality of BLEs; and
   a security system of the secure geographic area that receives second location information from the plurality of portable wireless devices, detects a security breach within the secure geographic area, sends a notification to each of the plurality of portable wireless devices, and assigns a user of one of the plurality of portable wireless devices to investigate the security breach based upon proximity of the one of the plurality of portable wireless devices to the security breach.

2. The apparatus as in claim 1 further comprising a cloud database that saves the second location information received from each of the plurality of portable wireless devices.

3. The apparatus as in claim 1 further comprising a plurality of security sensors, wherein each of the plurality of security sensors is either incorporated with a respective one of the plurality of BLEs or as a stand-alone device, and wherein each of the plurality of security sensors detects breaches of security within the secure geographic area.

4. The apparatus as in claim 1 wherein the first location information transmitted by the one of the plurality of BLEs comprises geographic coordinates.

5. The apparatus as in claim 3 wherein the first location information transmitted by the one of the plurality of BLEs comprises an identifier of one of the plurality of security sensors.

6. The apparatus as in claim 3 further comprising a processor that identifies the one of the plurality of portable wireless devices by determining a relative distance between each of the plurality of portable wireless devices and an activated security sensor of the plurality of security sensors.

7. The apparatus as in claim 3 further comprising a processor that sends details of the security breach, including an identifier and a location of an activated security sensor of the plurality of security sensors to the user of the one of the plurality of portable wireless devices.

8. The apparatus as in claim 3 wherein some of the plurality of security sensors comprise intrusion sensors.

9. The apparatus as in claim 3 wherein some of the plurality of security sensors comprise fire sensors.

10. An apparatus comprising:
a plurality of sensors, wherein each of the plurality of sensors is positioned within a secured geographic area;
a plurality of Bluetooth low energy devices (BLEs), wherein each of the plurality of BLEs is positioned within the secured geographic area;
a plurality of portable wireless devices within the secured geographic area, wherein each of the plurality of portable wireless devices receives first location information via signals from one of the plurality of BLEs; and
a security system of the secured geographic area that detects a security breach via an activated one of the plurality of sensors, receives second location information from the plurality of portable wireless devices, identifies one of the plurality of portable wireless devices relatively closest the activated one of the plurality of sensors, and sends instructions to a user of the one of the plurality of portable wireless devices to investigate the activated one of the plurality of sensors.

11. The apparatus as in claim 10 wherein the one of the plurality of BLEs is incorporated into one of the plurality of sensors.

12. The apparatus as in claim 10 further comprising a processor of the security system that sends a notification of the security breach and a location of the security breach to each of the plurality of portable wireless devices.

13. The apparatus as in claim 10 further comprising a display on the one of the plurality of portable wireless device that shows a notice of the security breach, an identifier of the security breach, and a location of the activated one of the plurality of sensors.

14. The apparatus as in claim 10 further comprising a cloud database that saves the second location information of each of the plurality of portable wireless devices.

15. The apparatus as in claim 14 further comprising a processor of the security system that downloads the second location information of each of the plurality of portable wireless devices.

16. The apparatus as in claim 15 wherein the processor of the security system compares the second location information of each of the plurality of portable wireless devices with a location of the activated one of the plurality of sensors.

17. The apparatus as in claim 10 wherein the first location information comprises an identifier of a proximate sensor of the plurality of sensors.

18. The apparatus as in claim 10 wherein the first location information comprises geographic coordinates.

19. An apparatus comprising:
a security system that protects a secured area;
a plurality of sensors of the security system, wherein each of the plurality of sensors is positioned within the secured area;
a plurality of Bluetooth low energy devices (BLEs), wherein each of the plurality of BLEs is positioned within the secured area;
a plurality of portable wireless devices within the secured area, wherein each of the plurality of portable wireless devices receives first location information via signals from one of the plurality of BLEs; and
a processor of the security system of the secured area that detects a security breach via an activated one of the plurality of sensors, receives second location information from the plurality of portable wireless devices, identifies one of the plurality of portable wireless devices relatively closest the activated one of the plurality of sensors and sends instructions to a user of the one of the plurality of portable wireless devices to investigate the activated one of the plurality of sensors.

20. The apparatus as in claim 19 wherein the processor of the security system sends a notification of the security breach and a location of the activated one of the plurality of sensors to each of the plurality of portable wireless devices.

21. The apparatus as in claim 19 wherein the plurality of BLEs comprise radio frequency (RF) sensors with location coordinates.

22. The apparatus as in claim 19 wherein the user comprises a guard carrying the one of the plurality of portable wireless devices, wherein, once the guard takes one or more actions to attend or address the security breach during an investigation, the guard acknowledges and reports the one or more actions directly from the one of the plurality of portable wireless devices to a cloud application or a security server, and wherein a corresponding file is updated in the cloud application or the security server.

23. The apparatus as in claim 22 wherein the one of the plurality of portable wireless devices saves an alarm acknowledgement along with an alarm location or coordinates.

24. The apparatus as in claim 19 further comprising a cloud server that retains the instructions sent to the user in order to ensure that the security breach is addressed within a predetermined time period by the user, wherein, when the user does not address the security breach within the predetermined time period, the cloud server automatically reassigns the security breach to a next available user.

25. The apparatus as in claim 19 wherein the processor of the security system tracks the plurality of portable wireless devices within the secured area.

26. The apparatus as in claim 19 wherein the processor of the security system tracks the user outside of any building within the secured area.

* * * * *